No. 691,190. Patented Jan. 14, 1902.
A. SHARP.
ROLLING PACKING TUBE.
(Application filed Oct. 26, 1901.)
(Model.)

Witnesses
Horace G. Oeitz
JB Josephslogh

Inventor:-
Archibald Sharp
by Marion & Marion
his Attys

THE NORRIS PETERS CO., PHOTO-LITHO., WASHINGTON, D. C.

UNITED STATES PATENT OFFICE.

ARCHIBALD SHARP, OF LONDON, ENGLAND.

ROLLING PACKING-TUBE.

SPECIFICATION forming part of Letters Patent No. 691,190, dated January 14, 1902.

Application filed October 26, 1901. Serial No. 80,143. (Model.)

*To all whom it may concern:*

Be it known that I, ARCHIBALD SHARP, a subject of the King of Great Britain, residing at Westminster, London, S.W., England, have invented certain new and useful Improvements in Rolling Packing-Tubes, of which the following is a specification.

This invention relates to improvements in the method of packing, in which a flexible tube doubled back and rolling upon itself has one end fixed to the inside of a cylinder and the other end to a plunger working in the cylinder.

I make the flexible tube (hereinafter called the "mitten") of india-rubber or other elastic material having embedded in it a series of parallel longitudinal threads, or it might be two series of parallel threads crossing each other at an acute angle in such manner that the tube is inextensible longitudinally, but is elastic radially. The india-rubber and the threads may be vulcanized together or the tube of india-rubber may be loosely supported by the tube formed by the threads.

Figure 1:
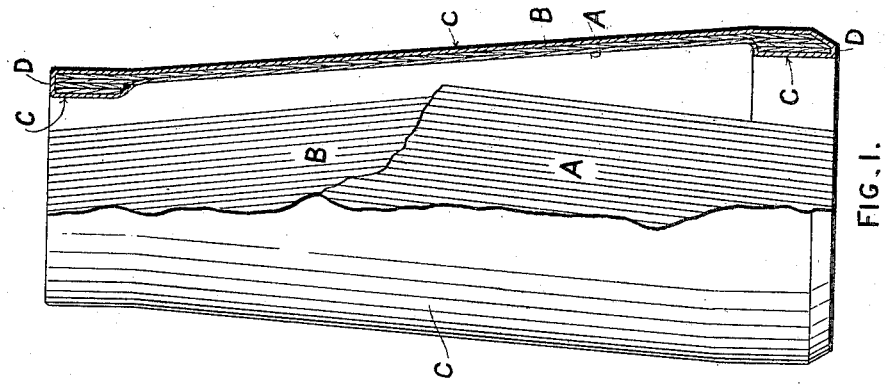

Figure 1 is a view, partly in section, showing one method of constructing the mitten. A is one layer of parallel threads, such as is used in pneumatic tires. B is another layer of the same, the threads of A crossing those of B at an acute angle. C is a layer of india-rubber, the function of which is to prevent the leakage of the fluid under pressure. The two circular ends D of the mitten are thickened for the purpose of forming fluid-tight joints with the cylinder and plunger, respectively. The mitten may be molded, tapered, or conical, as shown in the drawings.

Figure 2:
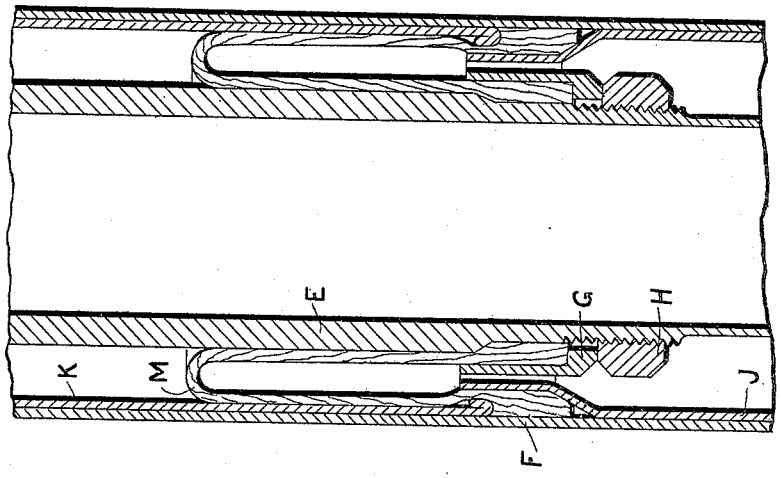

Fig. 2 is a sectional view showing one method of using the mitten. E is the plunger, and F the cylinder hereinbefore mentioned. G is a thimble holding one thickened end of the mitten against a tapered surface of the plunger. The ends are thickened in any suitable manner, as by increasing the thickness of the fabric, as seen in Fig. 1, and the rubber C being extended and folded upon itself to embrace such thickened portions. H is a nut screwed on the plunger and pressing the said thimble on the said thickened end of the mitten; but this nut is not always necessary. K and J are two distance-tubes, between which the other thickened end of the mitten is pressed. The distance-tube J has a tapered surface, so that the application of end pressure forces the thickened end of the mitten outward against the inside of the cylinder F, thus forming a fluid-tight joint. The fluid under pressure fills the part of the cylinder below the mitten M and may also fill the inside of the plunger E.

When a joint is made with a rolling packing-mitten, as described above, the two parts of the mitten are pressed into close contact with the cylinder and plunger, respectively, without any tendency to form creases or to rub against each other, while the longitudinal strength of the fabric prevents the joint from giving way even under high pressure.

I claim—

1. A rolling packing-tube for pneumatic or hydraulic apparatus, consisting of india-rubber or other elastic material having embedded in it a plurality of series of parallel threads nearly parallel to the axis of the tube, one series crossing the adjacent series at an acute angle.

2. A rolling packing-tube for pneumatic or hydraulic apparatus, comprising a conical tube of elastic material reinforced by a series of parallel threads one series crossing the adjacent series at an acute angle, the ends of the tube being thickened, as set forth.

3. The combination with a plunger having a tapered portion, and a cylinder, of a rolling packing-tube having thickened ends, a thimble engaging one of the thickened ends of the tube, means engaging the other end, and a nut on the plunger and serving to press the adjacent thimble against the thickened end of the tube.

4. The combination with a cylinder and the distance-tubes therein, one of which has a tapered surface, of a plunger having a tapered surface, a rolling packing-tube having thickened ends, a thimble engaging one of said ends, and a nut on the plunger engaging said thimble, all substantially as shown and described.

In witness whereof I have hereunto set my hand in the presence of two witnesses.

ARCHIBALD SHARP.

Witnesses:
SYDNEY MCARTHUR FOWLER,
G. E. EMBLETON.